United States Patent [19]
Wagner

[11] Patent Number: 4,788,450
[45] Date of Patent: Nov. 29, 1988

[54] BACKUP POWER SWITCH

[75] Inventor: Robert W. Wagner, Cherry Hill, N.J.

[73] Assignee: General Electric Company, Camden, N.J.

[21] Appl. No.: 99,433

[22] Filed: Sep. 11, 1987

[51] Int. Cl.⁴ .............................................. H02J 9/06
[52] U.S. Cl. ...................................... 307/64; 307/66; 365/229
[58] Field of Search ...................... 307/64, 66, 44, 46, 307/80, 81, 87; 365/229; 323/271, 299

[56] References Cited

U.S. PATENT DOCUMENTS

| | | |
|---|---|---|
| 4,492,876 | 1/1985 | Colbert et al. |
| 4,617,473 | 10/1986 | Bingham .............................. 307/66 |
| 4,631,470 | 12/1986 | Bingley .............................. 323/282 |
| 4,698,578 | 10/1987 | Mullersman et al. ............ 307/66 X |

OTHER PUBLICATIONS

"CMOS Cookbook" by Lancaster, pp. 217-221.
Texas Instruments Catalogues, pp. 3-69 and 3-70 relating to types SN54HC125,126 quadruple bus buffer gates with 3-state outputs, pp. 3-201 to 3-203 relating to types SN54HCT240 octal buffers and line drivers, pp. 3-257 and 3-258 relating to type SN54HC365 hex bus drivers, pp. 6-83 to 6-86 relating to types SN54LS240 octal buffers and line drivers, pp. 7-3 to 7-6 relating in general to CMOS circuitry and pp. 7-9 to 7-11 relating to IC protection circuits.

"Energy-Saving RAM-Power Tap" printed in NASA Tech Briefs, Sep. 1987.

Primary Examiner—William M. Shoop, Jr.
Assistant Examiner—Sharon D. Logan
Attorney, Agent, or Firm—Clement A. Berard, Jr.; Raymond E. Smiley; William H. Meise

[57] ABSTRACT

A P-channel field-effect transistor includes an inherent junction diode. As it is normally used, the inherent diode is back-biased and therefore effectively out of circuit. An uninterruptible power supply arrangement including primary and backup voltage sources supplies uninterrupted power to a load by way of two or more P-channel field-effect transistors connected so that their inherent diodes conduct to provide an OR function, independent of field-effect operation of the field-effect transistors. A control circuit controls the gate voltage relative to the source voltage of each transistor to selectively short-circuit the inherent diode of that one transistor which is connected to the power supply which is to energize the load. This reverse-biases the other inherent diodes and effectively removes the other power supply from the circuit, so that power for the load is drawn only from the selected power supply, there is no diode forward junction potential reducing the load voltage, and no excess dissipation. Certain embodiments of the invention use commercially available integrated circuits to provide many of the required functions for the uninterruptible supplies.

6 Claims, 5 Drawing Sheets

BACKUP POWER SWITCH

This invention was made with Government support under a Government contract. The Government has certain rights in this invention.

This invention relates to a solid-state power switch of the single-pole, multiple-throw type using field-effect transistors.

In electronic systems in which digital data is processed, it is often desirable to retain the data notwithstanding power failures. Some random access memories cannot retain data in the absence of energization voltage. Consequently, equipment using such memories cannot retain data in the event of a power failure.

The primary power supply for electronic equipment is often a voltage source. A voltage source is a source of electrical energy with a relatively low internal impedance, such that the output voltage does not change substantially notwithstanding changes in the current drain therefrom. A known technique for preventing loss of data in the event of a power failure is to provide a back-up voltage source power supply, typically a battery, which is coupled in-circuit to supply energization voltage during at least those periods in which the main power supply is not available. A very common arrangement for interconnecting a battery and a voltage source primary power supply is by the use of a diode-OR circuit. A diode-OR circuit includes a pair of diodes, each with an electrode connected by a common bus to the load or circuit to be continuously energized, and with the other electrode of one of the diodes connected to a separate primary voltage source, and with the other electrode of the other one of the diodes connected to the backup voltage source battery.

When a diode-OR circuit is used for connecting the load to a voltage source, the voltage applied to the load is less than the voltage of the voltage source by the forward junction potential of the diode. The forward junction potential of the diode depends upon the type of diode being used. Germanium diodes have a forward junction potential of only about 0.3 volts, but have leakage current which are very sensitive to the effects of temperature changes. Silicon diodes have leakage currents which are more stable under temperature extremes, and are more commonly used than Germanium, but have the disadvantage of a forward junction potential of about 0.7 volts. The voltage applied to the load is therefore less than the primary supply voltage during those intervals in which the primary supply voltage exceeds the backup supply voltage. The flow of load current through the conducting diode furthermore undesirably results in the dissipation of power in the diode, which power might otherwise be available for energizing the load. In particular, when a backup battery is used, a finite amount of power is available in the battery, and that amount which is dissipated in the diode of the OR circuit during backup operation reduces the useful period of power backup. If the diode forward junction potential or voltage drop could be reduced, the power dissipated therein would be reduced, and the required open-circuit battery voltage could be reduced, so that the battery size and weight could be reduced, or the same battery size could be maintained at lower voltage but with a larger ampere-hour rating, so that a longer period of backup powering could be achieved before the battery voltage decreased to the specified lower limit voltage of the circuit being energized.

The diode-OR circuit has yet another disadvantage, which is that when the primary power supply voltage is substantially equal to the voltage of the backup power supply, current is drawn from both the primary power supply and from the backup power supply. This is disadvantageous, in that if the backup power supply is a battery, the current drawn from the battery during operation with the primary power source operation may result in the backup battery being substantially discharged at the time at which the primary power fails, which then results in a shorter period of backup power availability than was expected.

The magnitude of the forward junction potential of a silicon diode is sufficiently large so that a problem occurs in their use in a diode-OR configuration for the powering of certain logic families. For example, some logic families such as TTL nominally operate with a 5.0 volt power supply, but are not specified or characterized for operation at supply voltages of less than 4.5 volts. For use with such logic circuits, 5.0 volt power supplies are very commonly available. If such a power supply is used with silicon diodes in an OR uninterruptible power supply configuration, the 0.7 volt forward junction potential of the conducting diode reduces the voltage available to the logic circuit to about 4.3 volts. This is an unacceptably low value of supply voltage. Even the use of Germanium or other diodes having a lesser value of forward junction potential may not be sufficient to allow use of a 5 volt power supply, because some tolerance must be expected in the raw direct primary power supply voltage produced by the transformer of the 5.0 volt power supply, and some allowance must be made for low AC voltage input to the transformer. Therefore, if it is desired to provide uninterruptible power to such a logic circuit, it may be necessary to use expensive custom-designed power supplies and discrete-component associated circuits, which may also be less reliable than standard systems and integrated associated circuits. Such custom-designed circuits often have one or more of the disadvantages of (a) substantial increase in the steady-state current drain from the primary power supply, (b) substantial increase in the steady-state current drain from the backup power supply during backup operation, (c) continuous current drain from the backup power supply during energization from the primary power supply, (d) severe limitation of current-carrying capability, in addition to the aforementioned disadvantages of cost and unreliability, due to the use of a large number of discrete components.

An arrangement is desired for combining primary and backup power supplies which minimizes these disadvantages.

DESCRIPTION OF THE DRAWING

FIG. 1b illustrates the equivalent circuit of the arrangement of FIG. 1a;

FIG. 2b illustrates the equivalent circuit of the arrangement of FIG. 2a;

DETAILED DESCRIPTION OF THE INVENTION

Figure 1A:
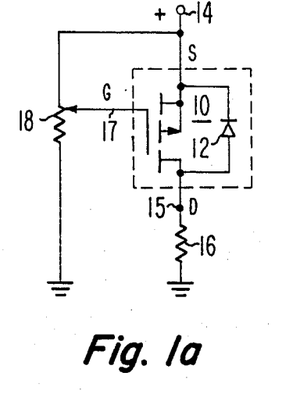
FIG. 1a illustrates a P-channel metal-oxide semiconductor (MOS) field-effect transistor (FET) connected in a circuit with a load, illustrating the diode inherent in the MOSFET structure.

FIG. 1a illustrates in symbolic form a silicon P-channel MOS field-effect transistor designated generally as 10 including gate (G), source (S) and drain (D) electrodes. A PN or junction diode 12 is illustrated within the dotted outline around field-effect transistor 10, with its cathode connected to the source and its anode connected to the drain. Diode 12 is inherent to the structure of field-effect transistor 10.

The source electrode S of field-effect transistor 10 of FIG. 1a is connected to a terminal 14, to which a positive (+) voltage is applied from a voltage source (not illustrated) relative to ground. The drain electrode D of field-effect transistor 10 is connected at a junction 15 to one end of a resistor 16, the other end of which is connected to ground. Gate G of field-effect transistor 10 is connected to the wiper 17 of a potentiometer 18, the resistive stator of which is connected between terminal 14 and ground.

Figure 1B:
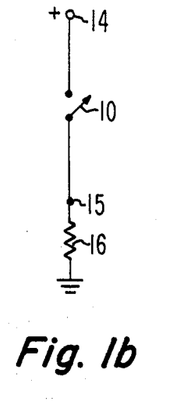

With the connections illustrated in FIG. 1a, field-effect transistor 10 may be operated as a switch, the equivalent circuit of which is illustrated in FIG. 1b. In FIG. 1b, resistor 16 is recognizable as a load which may be switched across the voltage source.

In FIG. 1a, field-effect transistor 10 includes a channel between the S and D electrodes, the conduction of which may be controlled by the gate voltage. In the arrangement of FIG. 1a, control of the conducting state of field-effect transistor 10 is accomplished by selecting the position of the wiper 17 of potentiometer 18. With the wiper in the uppermost position, as illustrated, a voltage approximately equal to the positive supply voltage is applied to gate G, and the channel between source and drain electrodes of field-effect transistor 10 becomes nonconductive. When wiper 17 is in the lowermost position, the gate G voltage of field-effect transistor 10 is quite negative with respect to the voltage of source S, and the channel between source and drain becomes conductive. Intermediate positions of the wiper of potentiometer 18 which render the transistor less than fully conductive or nonconductive are undesirable for switching operation.

It should be noted that inherent diode 10 has no effect on the circuit of FIG. 1a, as it is always reverse-biased and therefore nonconductive.

Figure 2A:
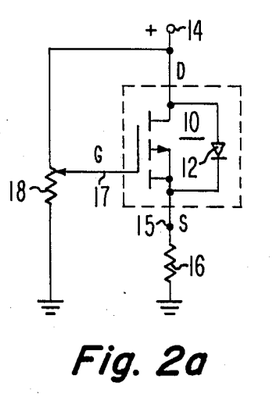
FIG. 2a illustrates a circuit similar to that of FIG. 1a, in which the source and drain connections of the MOSFET are reversed.

FIG. 2a is a schematic diagram similar to FIG. 1a, but in which the source and drain connections of field-effect transistor 10 are reversed. Elements of FIG. 2a corresponding to those of FIG. 1a are designated by the same reference numerals. With the connections of FIG. 2a, inherent diode 12 is no longer always back-biased, and the equivalent circuit is as illustrated in FIG. 2b.

Figure 2B:
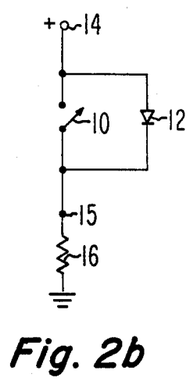

In FIG. 2b, so long as supply voltage is applied to terminal 14, or more properly between terminal 14 and ground, voltage will be applied to junction 15 and across load resistor 16. When switch 10 of FIG. 2b is open or nonconductive, diode 12 is forward biased and supplies to resistor 16 the difference between the supply voltage and the forward junction potential of diode 12. When switch 10 of FIG. 2b is closed or conductive, diode 12 is short-circuited or shorted out, and the full supply voltage is applied to resistor 16.

When terminal 14 of FIG. 2a is made positive relative to ground, inherent diode 12 of FET 10 conducts, whereupon junction 15 takes on a positive potential relative to ground equal to the difference between the supply voltage and the foward junction potential of the inherent diode. For example, if the voltage applied to terminal 14 is +5.0 volts, the voltage at junction 15 will immediately rise to 4.3 volts. As mentioned, this may be an insufficient voltage to reliably energize logic circuits represented by load resistor 16. However, by causing field-effect conduction through the source-to-drain channel of field-effect transistor 10, inherent diode 12 is shorted, and the voltage at junction 15, and across load resistor 16, rises to the full supply voltage (although there may be some slight voltage drop due to the channel).

When the source-to-drain channel of FET 10 is conductive, the voltage across inherent diode 12 continues to be in a forward-biasing direction, but its magnitude is insufficient to cause significant conduction through the inherent diode.

Control of the source-to-drain channel of field-effect transistor 10 of FIG. 2a to a conductive condition is accomplished by making its gate G negative with respect to the source S. In the arrangement of FIG. 2a, conduction of the channel is accomplished by moving wiper 17 to the lowermost position of potentiometer 18, whereby the gate G voltage is approximately equal to ground voltage. Due to the conduction of inherent diode 12, source S and junction 15 are at a positive potential nearly equal to the supply voltage. Gate G is therefore at a negative potential relative to source S, as required for field-effect operation, to cause the source-to-drain channel to conduct. When field-effect transistor 10 goes into field-effect conduction due to the relatively negative gate-to-source voltage, inherent diode 12 is shorted, and the voltage at source S and at junction 15 becomes more positive. An increase in the positive potential of source S effectively makes the gate G voltage more negative than the source S, thereby tending to enhance the field-effect operation.

Control of the source-to-drain channel of field-effect transistor 10 of FIG. 2a to a nonconductive condition is accomplished by setting its gate G at a voltage which is equal to or more positive than the voltage of source S. In the arrangement of FIG. 2a, this is accomplished by setting wiper 17 of potentiometer 18 to its uppermost position, whereby the gate G voltage is approximately equal to the supply voltage. Field-effect operation ceases, and the voltage at junction 15 and at source S decreases, further enhancing the turn-off of the field-effect operation. When the voltage at junction 15 and source S drops 0.7 volts (for a Silicon structure) below the supply voltage at terminal 14, inherent diode 12 conducts to prevent any further decrease in the voltage at junction 15 and across load resistor 16.

Figure 3:
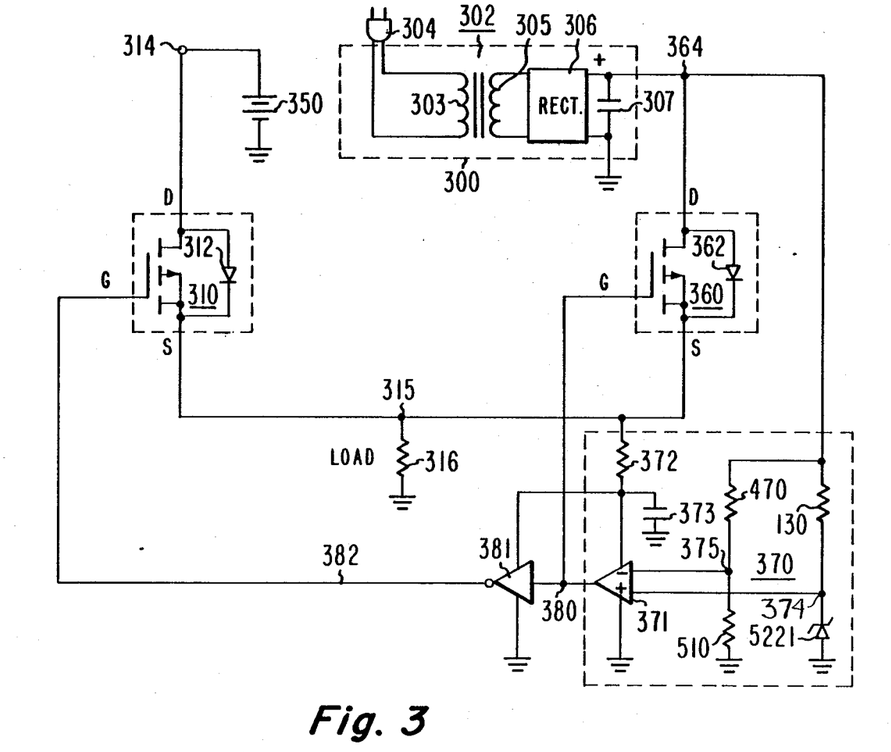
FIG. 3 is a simplified schematic diagram of a load connected by way of MOSFETs to primary and backup power supplies.

In FIG. 3, two P-channel field-effect transistors 310 and 360, each including a gate, source, and drain, have their sources connected together at a junction 315. Junction 315 is connected to one end of a load represented by a resistor 316. The drain of field-effect transistor 310 is connected at backup voltage terminal 314 to the positive terminal of a backup power supply illustrated as a battery 350. The drain of field-effect transistor 360 is connected at a primary voltage terminal 364 to the positive terminal of a primary power supply 300. A control circuit designated generally as 370, which forms no part of the invention, is connected to terminal 364 for sensing the availability of primary voltage, and produces a control signal at a junction 380 for application to the gate G of field-effect transistor 360. Junction 380 is also connected to the input of an inverting amplifier 381, the output of which is coupled to the gate G of field-effect transistor 310.

Primary power supply 300 may be of any conventional type. As illustrated in FIG. 3, primary power supply 300 includes a transformer designated generally as 302 including a primary winding 303 connected to an AC power plug 304. Primary winding 303 of transformer 302 is magnetically coupled to a secondary winding 305. Energy coupled from plug 304 to primary winding 303 is transformed and coupled to secondary winding 305 of transformer 302, and is rectified by a rectifier assembly 306 to produce a pulsating direct current at output terminal 364, which is integrated or filtered by a filter capacitor 307. When AC power is available at plug 304, a direct voltage is produced by primary power supply 300 at terminal 364. When the primary power is absent, no direct voltage is produced at terminal 364 relative to ground. If the AC voltage decreases, as may occur during a brownout, the voltage at terminal 364 may decrease from the nominal value.

Control circuit 370, as illustrated in FIG. 3, includes a 130 ohm resistor, designated 130, connected in series with a Motorola type 1N5221 2.4 volt zener diode designated 5221, with a terminal 374 therebetween. When the voltage at terminal 374 exceeds 2.4 volts, the voltage at the cathode of zener diode 5221 remains constant at 2.4 volts. Terminal 364 is also connected to a voltage divider including a 470 ohm resistor, designated 470, connected at a junction 375 to a 510 ohm resistor, designated 510. When the direct voltage at terminal 364 exceeds 4.5 volts after start-up, the voltage at junction 375 exceeds 2.4 volts. A comparator 371 has its inverting input terminal connected to junction 375 and its noninverting input terminal connected to junction terminal 374. Comparator 371 and inverting amplifier 381 derive their power from a filter including a resistor 372 and a capacitor 373 which are connected to junction 315 to receive uninterrupted power.

At initial start-up, application of direct voltage to either terminal 314 or primary voltage terminal 364 causes the inherent diode of the associated field-effect transistor to conduct, thereby producing an initial voltage at terminal 315 and across load resistor 316, which allows the control circuit 370 to be energized for operation. Thus, if either primary or backup power is available, the voltage at junction 315 is uninterrupted. If the supply voltage is sufficient, the load represented by resistor 316 will operate reliably even under this condition.

During those intervals in which the voltage produced by primary power supply 300 at terminal 364 is greater than 4.5 volts, the voltage at junction 375 exceeds the voltage at junction 374, and comparator 371 produces a voltage at junction 380 and at gate G of field-effect transistor 360 which is near ground. Under these conditions, field-effect transistor 360 conducts in a field-effect operating mode, thereby short-circuiting its inherent diode 362. Thus, so long as primary power supply 300 produces its nominal 5.0 volts, or at least 4.5 volts, the voltage is applied to junction 315 and across load resistor 316 without reduction by a diode forward junction potential.

If the AC power applied to primary power supply 300 fails, or if the primary voltage terminal 364, for any reason, drops below 4.5 volts, comparator 371 switches and produces a voltage on terminal 380 which has a relatively high positive value. This high positive value disables the field-effect conduction of field-effect transistor 360. The high positive value of voltage on terminal 380 is inverted by the action of amplifier 381 to produce a voltage near ground on conductor 382 and on the gate of field-effect transistor 310, which causes field-effect transistor 310 to enter the field-effect conduction condition. Under this condition, inherent diode 362 of field-effect transistor 360 becomes unbiased or reverse biased, and the power is supplied from backup power supply 350 by way of the conducting source-to-drain channel of field-effect transistor 310.

Thus, the arrangement of FIG. 3 may be seen to include a diode-OR connection formed from the inherent diodes of two P-channel field-effect transistors, in which the diodes are shorted under control of the control circuit to increase the useful load voltage by enabling the channel in parallel with one of the inherent diodes.

Figure 4A:
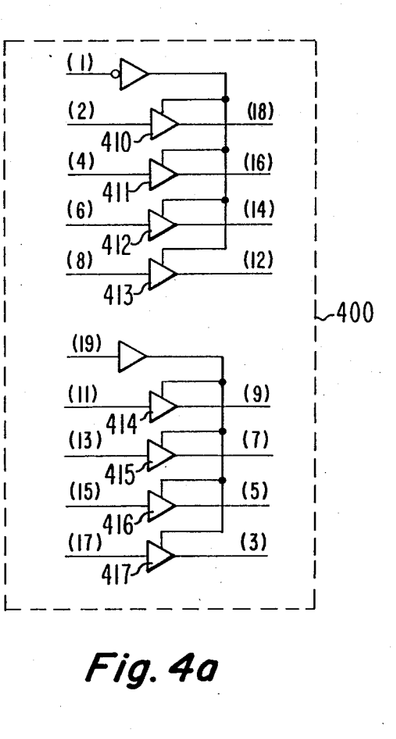
FIG. 4a illustrates a simplified schematic diagram of a Texas Instruments type SN54/74HCT241 CMOS octal buffer and line driver integrated circuit as illustrated in the data sheet therefor.

FIG. 4a is a schematic illustration corresponding to the data sheet illustration of a type SN54HCT241 or SN74HCT241 octal buffer and line driver integrated circuit 400 with 3-state output, with pin numbers indicated. Integrated circuit 400 includes eight drivers 410–417. Integrated circuit 400 receives energization potential at positive and negative terminals 20 and 10, respectively (not illustrated in FIG. 4a).

Figure 4B:
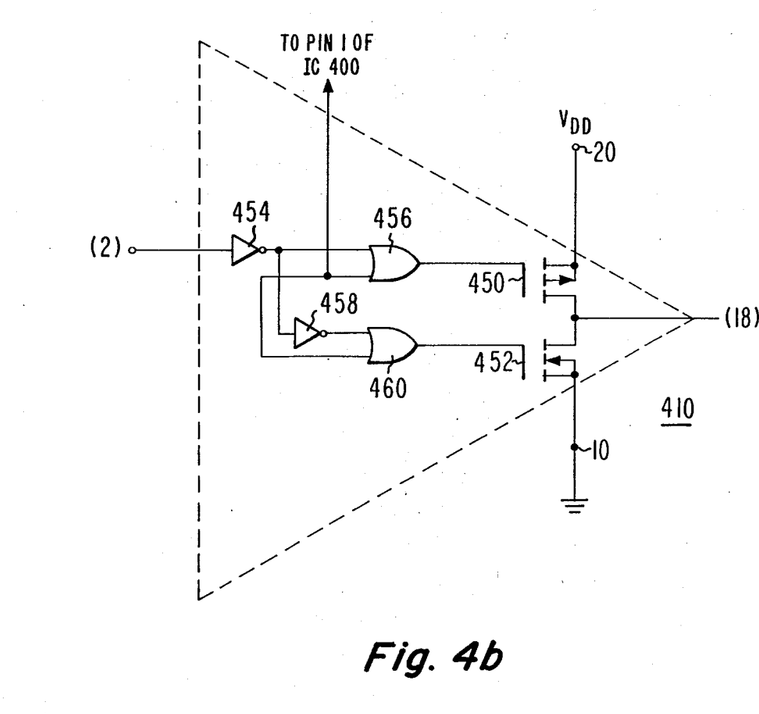
FIG. 4b is a schematic diagram of one of drivers thereof.

FIG. 4b illustrates line driver 410 of FIG. 4a in more detail. Driver 410 includes a P-channel FET 450, the source of which is coupled to terminal 20 of integrated circuit 400, and the drain of which is coupled to terminal 18. An N-channel FET 452 has its drain connected to IC terminal 18 and its source connected to ground terminal 10 of IC 400. An inverter 454 has its input connected to terminal 2 of IC 400. The output of inverter 454 is connected to input terminal of an OR gate 456, and by way of a further inverter 458, to the input of a NOR gate 460. In accordance with an aspect of the invention, integrated circuit 400 is connected for operation in an uninterruptible power supply configuration, not unlike the arrangement of FIG. 3.

Figure 5:
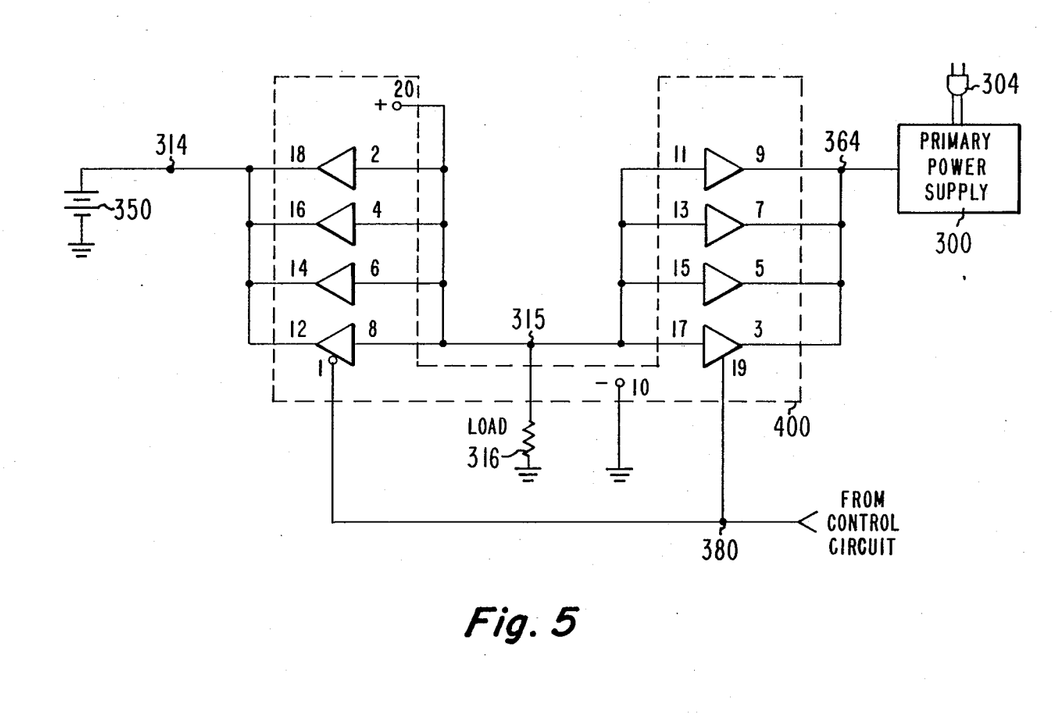
FIG. 5 is a schematic diagram of a load interconnected with primary and backup power supplies using the integrated circuit of FIG. 4.

FIG. 5 is similar to FIG. 3, and elements of FIG. 5 corresponding to those of FIG. 3, are designated by the same reference numerals. FIG. 5 differs from FIG. 3 in that integrated circuit 400 of FIG. 4 is used instead of field-effect transistors 310 and 360 and inverting amplifier 381. Generally speaking, for use in FIG. 5, pins 12, 14, 16, and 18 of integrated circuit 400 of FIG. 4 are interconnected and connected to backup voltage terminal 314 for receiving backup voltage from backup power supply 350, and for coupling voltage to the load represented by resistor 316 by way of terminal 20. Also, pins 2, 4, 6, and 8 of integrated circuit 400 are interconnected and connected to junction 315 for preventing the N-channel FETs (such as 452 of FIG. 4b) from turning on or becoming conductive under any condition. Similarly, pins 3, 5, 7, and 9 are interconnected and coupled to primary voltage terminal 364 for receiving primary voltage from primary power supply 300 for supplying primary power to load 316 by way of terminal 20. Pins 11, 13, 15, and 17 are interconnected and coupled to junction terminal 315 for the same purpose as pins 2, 4, 6 and 8. Terminal 20 of integrated circuit 400 is connected to junction terminal 315 for supplying uninterrupted power thereto, and terminal 10 of integrated circuit 400 is connected to ground. Terminal 380 in FIG. 5 receives a logic high or logic low control signal from an appropriate control circuit (not illustrated in FIG. 5) but which may be similar to control circuit 370 of FIG. 5. Junction 380 is connected to noninverting input terminal 19 of integrated circuit 400, and is also connected to inverting input terminal 1. Thus, there is no need in the arrangement of FIG. 5 for an inverting amplifier such as amplifier 381 of FIG. 3, for this function is included within integrated circuit 400.

In an application of a Texas Instrument type SN54/74 HCT241 integrated circuit, with input voltage to a terminal corresponding to terminal 364 equal to +5.01 VDC, the output voltage at junction 315 was +4.92 VDC at 10 mA into a resistive load. At 46 mA, the output voltage was +4.61 VDC. Excess current flowing to ground from pin 10 (corresponding to an overhead current) was less than 0.1 μA. Currents and voltages within this range are more than adequate for backup of at least some types of memories.

Figure 6:
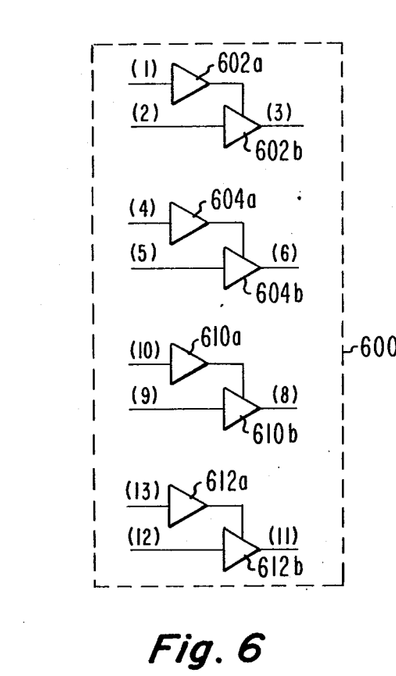
FIG. 6 illustrates a simplified schematic diagram of a Texas Instruments type SN54/24HC126 CMOS integrated circuit with quadruple bus buffer gates with 3-state outputs as illustrated in the data sheet therefor.

Other types of CMOS circuits may be used to produce uninterruptible supply arrangements in accordance with the invention. FIG. 6 is a simplified schematic diagram of a Texas Instrument type SN54/74 HC126 quadruple buffer with 3-state output integrated circuit. The numbers correspond to pin numbers of the integrated circuit. The driver circuits of FIG. 6 are similar to that illustrated in FIG. 4b. The power required by this integrated circuit is applied to pins 7 and 14 (not illustrated).

Figure 7:
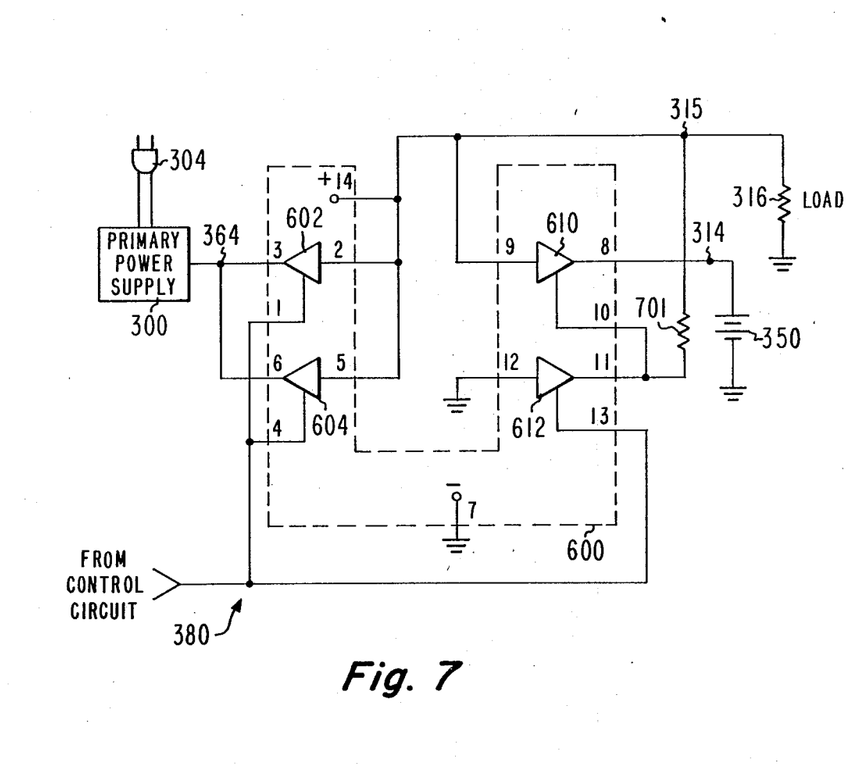
FIG. 7 is a schematic diagram of a load interconnected with primary and backup power supplies using the integrated circuit of FIG. 5.

FIG. 7 illustrates an uninterruptible supply using integrated circuit 600 of FIG. 6. Elements of FIG. 7 corresponding to those of FIGS. 3 and 6 are designated by the same reference numerals. The major difference between the circuits of FIGS. 5 and 7 relates to the implementation of the inverting amplifier corresponding to 381 of FIG. 3. In IC 600 of FIG. 6, the individual drivers are all conductive when the enable inputs (terminals 1, 4, 10 and 13) are high. By using driver 612 as an inverter, however, the desired control is achieved. In FIG. 7, pin 12 of IC 600 is grounded, thereby making driver 612 into a two-state device which conducts current from pin 11 to ground pin 7 when enable input terminal 13 is at a logic high level, and which open-circuits terminal 13 when the enable input is logic low. Thus, driver 612 in conjunction with resistor 701 is an inverting amplifier relative to the control signal received from junction 380, and is connected to the enable input (pin 10) of driver 610. Driver 610 thereupon responds in opposite manner to the control signal by comparison with drivers 602 and 604, which receive the control signal directly from junction 380.

Other embodiments of the invention will be apparent to those skilled in the art. In particular, the control circuit (37 of FIG. 3) may be of any degree of complexity, and make its logic decisions based upon sensing voltages other than the primary voltage, and may also use a plurality of inputs for producing the switching signals. While only two power sources (primary and backup) have been illustrated and described, three or more supplies may be used, connected to a common junction such as 315 by way of three of more FETs, under the control of a multiple-output control circuit. Also, N-channel field-effect transistors may be used instead of P-channel devices, but with negative rather than positive power supplies, and with appropriate control voltages.

What is claimed is:

1. A control switch arrangement for supplying power to a load from one of a plurality of voltage sources of substantially equal potential, each of said voltage sources including a positive terminal and a negative terminal, said control switch arrangement comprising:

a plurality of P-channel field-effect transistor means formed within a single integrated circuit, each field-effect transistor means including at least a gate electrode, a source electrode and a drain electrode, each of said field-effect transistor means including at least one controllable path for the flow of current between said source and drain electrodes, said controllable path being enabled for the flow of current when the corresponding gate electrode is at a potential which is negative with respect to the potential of said source electrode, each of said field-effect transistor means also including an inherent semiconductor diode, the anode of which is connected to said drain electrode, and the cathode of which is connected to said source electrode, the drain electrode of each of said plurality of field-effect transistor means being adapted to be connected to the positive terminal of one of said voltage sources;

interconnection means coupled to said source electrode of each of said field-effect transistor means, and to said load, and adapted to be coupled to said negative terminal of each of said voltage sources, for connecting said source electrodes in common to a first terminal of said load, and for connecting a second terminal of said load in common to said negative terminal of each of said voltage sources, whereby said inherent diode of one of said field-effect transistor means is rendered conductive when that one of said voltage sources to which its anode electrode is connected is energized, to thereby render the potential at said first terminal of said load positive relative to said second terminal, and said load is thereby energized independent of field-effect operation of any one of said field-effect transistor means, but in the event that more than one of said voltage sources is available, power may undesirably be drawn from more than one voltage source, and power is undesirably dissipated due to the flow of load current through a conducting diode and the load voltage is also undesirably reduced by the forward junction potential of said inherent diode which conducts;

control means coupled to said gate electrode of each of said field-effect transistor means, and to said interconnection means, for rendering the potential of said gate electrode of only one of said field-effect transistor means negative relative to the source electrode of said one of said field-effect transistor means, and for rendering the potential of said gate electrodes of the other ones of said field-effect transistor means positive relative to said source electrodes of said other ones of said field-effect transistor means, whereby said one field-effect transistor means in which said controlled current path is rendered conductive results in a short-circuit of its associated inherent diode to thereby raise said load voltage to substantially equal the potential of said voltage sources, and to eliminate said undesirable power dissipation in a conducting diode, and to reverse-bias said inherent diodes of said other field-effect transistor means, and thereby eliminate said undesirable draw of power from more than one voltage source;

wherein each of said field-effect transistor means comprises four paralleled field-effect transistors.

2. An arrangement according to claim 1, wherein said single integrated circuit further includes at least a portion of said control means.

3. An arrangement according to claim 2, wherein said portion of said control means comprises inverting means for relatively inverting said potential of said gate electrode of said one of said field-effect transistor means relative to said potential of said gate electrodes of the other ones of said field-effect transistor means.

4. A control switch arrangement for supplying power to a load from primary and backup voltage sources of substantially equal potential, each of said voltage sources including a positive terminal and a negative terminal, said control switch arrangement comprising:

first and second P-channel field-effect transistor means, each including at least a gate electrode, a source electrode and a drain electrode, each of said first and second field-effect transistor means including at least one controllable path for the flow of current between said source and drain electrodes, said controllable path being enabled for the flow of current when the corresponding gate electrode is at a potential which is negative with respect to the potential of said source electrode, each of said first and second field-effect transistor means also including an inherent semiconductor diode, the anode of which is connected to its associated drain electrode, and the cathode of which is connected to its associated source electrode, said drain electrode of said first field-effect transistor means being adapted to be connected to the positive terminal of said primary voltage source, and said drain electrode of said second field-effect transistor means being adapted to be connected to the positive terminal of said backup voltage source;

interconnection means coupled to said source electrodes of said first and second field-effect transistor means, and to said load, and adapted to be coupled to said negative terminals of said primary and backup voltage sources, for connecting said source electrodes in common to a first terminal of said load, and for connecting a second terminal of said load in common to said negative terminals of said primary and backup voltage sources, whereby said inherent diode of one of said first and second field-effect transistor means is rendered conductive when that one of said primary and backup voltage sources, respectively, to which its anode electrode is connected is energized, to thereby render the potential at said first terminal of said load positive relative to said second terminal, and said load is thereby energized independent of field-effect operation of either said first or second field-effect transistor means, but if both said primary and backup voltage sources is available, power may undesirably be drawn from said backup voltage source, and power is undesirably dissipated due to the flow of load current through said inherent diode of said second field-effect transistor, and the load voltage is also undesirably reduced by the forward junction potential of said inherent diode of said first field-effect transistor;

control means coupled to said gate electrodes of said first and second field-effect transistor means, and to said interconnection means, for rendering the potential of said gate electrode of said first field-effect transistor means negative relative to source electrode of said first field-effect transistor means, and for rendering the potential of said gate electrode of said second field-effect transistor means positive relative to said source electrode of said second field-effect transistor means for selecting operation from said primary voltage source, whereby said first field-effect transistor means in which said controlled current path is rendered conductive results in a short-circuit of its associated inherent diode to thereby raise said load voltage to substantially equal the potential of said primary voltage source, and to eliminate said undesirable power dissipation in said inherent diode of said first field-effect transistor means, and to reverse-bias said inherent diode of said second field-effect transistor means, and thereby eliminate said undesirable draw of power from said backup voltage source during operation from said primary voltage sources, and for rendering the potential of said gate electrode of said second field-effect transistor means negative relative to said source electrode of said second field-effect transistor means, and for rendering the potential of said gate electrode of said first field-effect transistor means positive relative to said source electrode of said first field-effect transistor means for selecting operation from said backup voltage source;

wherein each of said first and second field-effect transistor means comprises four paralleled field-effect transistors.

5. An arrangement according to claim 4, wherein said first and second field-effect transistor means are part of a single integrated circuit, and said single integrated circuit further includes at least a portion of said control means.

6. An arrangement according to claim 5, wherein said portion of said control means comprises inverting means.

* * * * *